United States Patent
Sugata

(10) Patent No.: US 12,047,862 B2
(45) Date of Patent: Jul. 23, 2024

(54) DATA ACQUISITION METHOD, INFORMATION PROCESSING SYSTEM, AND NON-TRANSITORY COMPUTER READABLE MEDIUM STORING DATA ACQUISITION PROGRAM

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 501 days.

(21) Appl. No.: 17/522,779

(22) Filed: Nov. 9, 2021

(65) Prior Publication Data

US 2022/0182916 A1 Jun. 9, 2022

(30) Foreign Application Priority Data

Dec. 3, 2020 (JP) ................................ 2020-200983

(51) Int. Cl.
  *H04W 40/22* (2009.01)
  *H04W 40/12* (2009.01)
  *H04W 40/20* (2009.01)
  *H04W 88/08* (2009.01)

(52) U.S. Cl.
  CPC ........... *H04W 40/22* (2013.01); *H04W 40/12* (2013.01); *H04W 40/20* (2013.01); *H04W 88/085* (2013.01)

(58) Field of Classification Search
  None
  See application file for complete search history.

(56) References Cited

U.S. PATENT DOCUMENTS

| | | | |
|---|---|---|---|
| 10,810,059 B2 * | 10/2020 | Tokuchi | .............. H04L 43/0817 |
| 2015/0256968 A1 | 9/2015 | Terazaki et al. | |
| 2018/0278350 A1 * | 9/2018 | Nishi | ..................... H04B 17/40 |
| 2020/0322491 A1 * | 10/2020 | Oshima | .............. H04N 1/00209 |
| 2020/0389936 A1 * | 12/2020 | Yamamoto | .......... H04W 12/088 |

FOREIGN PATENT DOCUMENTS

| | | | | |
|---|---|---|---|---|
| CN | 107547264 | A | * | 1/2018 |
| JP | 2012060373 | A | * | 3/2012 |
| JP | 2016173729 | A | * | 9/2016 |
| JP | 2019012923 | A | * | 1/2019 |
| JP | 6519975 | B2 | | 5/2019 |

* cited by examiner

*Primary Examiner* — Saumit Shah
(74) *Attorney, Agent, or Firm* — Oliff PLC

(57) ABSTRACT

A server determines, for each of a plurality of repeaters, a terminal apparatus to be connected, and a connection order in which a plurality of repeaters connect to the terminal apparatuses to be connected, based on a latest upload time of each detection data generated by the plurality of terminal apparatuses, and identification information of a plurality of terminal apparatuses, so that detection data is preferentially acquired from a terminal apparatus that generated detection data of which the upload time is early in the information processing system. When each of the plurality of repeaters receives, from the server, the identification information of the terminal apparatus to be connected and the connection order information thereof, the plurality of repeaters connects to the terminal apparatuses to be connected according to the order indicated by the connection order information, and acquire detection data therefrom.

17 Claims, 12 Drawing Sheets

| UPLOAD TIME | TERMINAL APPARATUS ID | REPEATER ID | CONNECTION ORDER |
|---|---|---|---|
| 1000000019 | ST6 | HUB01 | 1 |
| 1000000023 | ST12 | HUB01 | 2 |
| 1000000045 | ST7 | HUB02 | 1 |
| 1000000089 | ST9 | HUB02 | 2 |
| 1000000101 | ST13 | HUB01 | 3 |
| 1000000124 | ST2 | HUB02 | 3 |
| 1000000165 | ST3 | HUB01 | 4 |
| 1000000171 | ST8 | | |
| 1000000189 | ST1 | HUB03 | 1 |
| 1000000251 | ST10 | HUB01 | 5 |
| 1000000262 | ST11 | HUB01 | 6 |
| 1000000286 | ST4 | HUB02 | 4 |
| 1000000290 | ST14 | HUB03 | 2 |
| 1000000311 | ST5 | HUB01 | 7 |

Fig. 8

⟨FIRST STATE⟩

| TERMINAL APPARATUS ID | REPEATER ID | CONNECTION ORDER |
|---|---|---|
| ST6 | HUB01 | 1 |
| ST12 | HUB01 | 2 |
| ST7 | HUB02 | 1 |
| ST9 | HUB02 | 2 |
| ST13 | HUB01 | 3 |
| ST2 | HUB02 | 3 |
| ST3 | HUB01 | 4 |
| ST8 | | |
| ST1 | HUB03 | 1 |
| ST10 | HUB01 | 5 |
| ST11 | HUB01 | 6 |
| ST4 | HUB02 | 4 |
| ST14 | HUB03 | 2 |
| ST5 | HUB01 | 7 |

⟨SECOND STATE⟩

| TERMINAL APPARATUS ID | REPEATER ID | CONNECTION ORDER |
|---|---|---|
| ST6 | HUB01 | 1 |
| ST12 | HUB01 | 2 |
| ST7 | HUB02 | 1 |
| ST9 | HUB03 | 1 |
| ST13 | HUB01 | 3 |
| ST2 | HUB02 | 2 |
| ST3 | HUB01 | 4 |
| ST8 | | |
| ST1 | HUB03 | 2 |
| ST10 | HUB01 | 5 |
| ST11 | HUB01 | 6 |
| ST4 | HUB02 | 3 |
| ST14 | HUB03 | 3 |
| ST5 | HUB01 | 7 |

⟨THIRD STATE⟩

| TERMINAL APPARATUS ID | REPEATER ID | CONNECTION ORDER |
|---|---|---|
| ST6 | HUB01 | 1 |
| ST12 | HUB01 | 2 |
| ST7 | HUB02 | 1 |
| ST9 | HUB03 | 1 |
| ST13 | HUB01 | 3 |
| ST2 | HUB02 | 2 |
| ST3 | HUB03 | 2 |
| ST8 | | |
| ST1 | HUB03 | 3 |
| ST10 | HUB01 | 4 |
| ST11 | HUB01 | 5 |
| ST4 | HUB02 | 3 |
| ST14 | HUB03 | 4 |
| ST5 | HUB01 | 6 |

⟨FOURTH STATE⟩

| TERMINAL APPARATUS ID | REPEATER ID | CONNECTION ORDER |
|---|---|---|
| ST6 | HUB01 | 1 |
| ST12 | HUB01 | 2 |
| ST7 | HUB02 | 1 |
| ST9 | HUB03 | 1 |
| ST13 | HUB01 | 3 |
| ST2 | HUB02 | 2 |
| ST3 | HUB03 | 2 |
| ST8 | HUB03 | 3 |
| ST1 | HUB03 | 4 |
| ST10 | HUB01 | 4 |
| ST11 | HUB01 | 5 |
| ST4 | HUB02 | 3 |
| ST14 | HUB03 | 5 |
| ST5 | HUB01 | 6 |

Fig. 9

| UPLOAD TIME | TERMINAL APPARATUS ID | REPEATER ID | CONNECTION ORDER |
|---|---|---|---|
| 1000000019 | ST6 | HUB01 | 1 |
| 1000000023 | ST12 | HUB01 | 2 |
| 1000000045 | ST7 | HUB02 | 1 |
| 1000000089 | ST9 | HUB03 | 1 |
| 1000000101 | ST13 | HUB01 | 3 |
| 1000000124 | ST2 | HUB02 | 2 |
| 1000000165 | ST3 | HUB03 | 2 |
| 1000000171 | ST8 | HUB03 | 3 |
| 1000000189 | ST1 | HUB03 | 4 |
| 1000000251 | ST10 | HUB01 | 4 |
| 1000000262 | ST11 | HUB01 | 5 |
| 1000000286 | ST4 | HUB02 | 3 |
| 1000000290 | ST14 | HUB03 | 5 |
| 1000000311 | ST5 | HUB01 | 6 |

Fig. 10

DATA ACQUISITION METHOD, INFORMATION PROCESSING SYSTEM, AND NON-TRANSITORY COMPUTER READABLE MEDIUM STORING DATA ACQUISITION PROGRAM

CROSS REFERENCE TO RELATED APPLICATIONS

This application is based upon and claims the benefit of priority from Japanese patent application No. 2020-200983, filed on Dec. 3, 2020, the disclosure of which is incorporated herein in its entirety by reference.

BACKGROUND

The present disclosure relates to a data acquisition method, an information processing system, and a non-transitory computer readable medium storing a data acquisition program for acquiring detection data from a plurality of terminal apparatuses.

In the past, a system in which a server acquires detection data generated by a plurality of terminal apparatuses through a plurality of repeaters has been proposed. In such a system, communication areas of the plurality of repeaters may overlap each other.

For example, when portable or mobile terminal apparatuses are used, one or more terminal apparatuses may be present in a space where communication areas of a plurality of repeaters overlap each other. In such a situation, immediately after a given repeater acquires detection data from a terminal apparatus that is present in the space where communication areas overlap each other, another repeater may acquire the detection data from that terminal apparatus. In such a case, though the amount of the newly acquired detection data is small, the other repeater communicates with and connects to (hereinafter simply expressed to "connects to") the terminal apparatus and acquires the detection data, and as a result, a useless session is performed. Therefore, there has been a problem that, as regards the whole system, it is impossible to efficiently acquire detection data from a plurality of terminal apparatuses.

In this regard, Japanese Patent No. 6519975 discloses a radio communication system in which a plurality of peripheral devices acquire data from one peripheral device.

SUMMARY

However, since the radio communication system disclosed in Japanese Patent No. 6519975 is a system in which data is acquired from one peripheral device, it cannot solve the above-described problem that, in a system including a plurality of terminal apparatuses, it is impossible to efficiently acquire detection data from these terminal apparatuses.

The present disclosure has been made in order to solve the above-described problem, and an object thereof is to provide a data acquisition method, an information processing system, and a non-transitory computer readable medium storing a data acquisition program capable of efficiently acquiring detection data from a plurality of terminal apparatuses.

A first exemplary aspect is a data acquisition method performed in an information processing system including a plurality of terminal apparatuses, a plurality of repeaters, and a server, in which each of the plurality of repeaters requests detection data from a terminal apparatus with which that repeater can communicate, the plurality of terminal apparatuses generates detection data in response to requests from the plurality of repeaters and transmit the generated detection data to the plurality of repeaters, each of the plurality of repeaters transmits, to the server, the detection data received from the terminal apparatus with which that repeater can communicate, each of the plurality of repeaters transmits its own identification information to at least one of the plurality of repeaters, the plurality of repeaters generates a terminal-apparatus list including identification information of terminal apparatuses received from the terminal apparatuses, and transmit the generated terminal-apparatus list to the server, the server determines, for each of the plurality of repeaters, a terminal apparatus to be connected, and a connection order in which the plurality of repeaters connect to the terminal apparatuses to be connected, based on an upload time, which is a latest time at which detection data of each of the plurality of terminal apparatuses was uploaded to the server, and the identification information of the plurality of terminal apparatuses, so that detection data is preferentially acquired from a terminal apparatus that generated detection data of which the upload time is early in the information processing system, the server transmits, to each of the plurality of repeaters, the identification information of the terminal apparatus to which that repeater is to connect and connection order information indicating a connection order thereof, and when the plurality of repeaters receives, from the server, the identification information of the terminal apparatuses to be connected and the connection order information thereof, the plurality of repeaters connects to the terminal apparatuses to be connected according to the order indicated by the connection order information, and acquire detection data therefrom.

Another exemplary aspect is an information processing system including:

a plurality of terminal apparatuses configured to generate and provide detection data;

a plurality of repeaters configured to acquire detection data from each of the plurality of terminal apparatuses and transmit the acquired detection data to a server; and a server configured to determine terminal apparatuses to be connected to which the plurality of repeaters connect, and a connection order in which the plurality of repeaters connect to the terminal apparatuses to be connected, in which each of the plurality of terminal apparatuses transmits its own identification information to at least one repeater, the repeater generates a terminal-apparatus list including identification information of terminal apparatuses received from the terminal apparatuses, and transmits the generated terminal-apparatus list to the server, the server is configured to:

determine, for each of the plurality of repeaters, a terminal apparatus to be connected and a connection order thereof based on an upload time, which is a latest time at which detection data of each of the plurality of terminal apparatuses was uploaded to the server, and the identification information of the plurality of terminal apparatuses, so that detection data is preferentially acquired from a terminal apparatus that generated detection data of which the upload time is early in the information processing system; and transmit, to each of the plurality of repeaters, the identification information of the terminal apparatus to which that repeater is to connect and connection order information indicating a connection order thereof, and when the plurality of repeaters receives, from the server, the identification information of the terminal apparatuses to be connected and the connection order information thereof, the plurality of repeaters connects to the terminal apparatuses to be connected according to the order indicated by the connection order information, and acquire detection data therefrom.

Another exemplary aspect is a non-transitory computer readable medium storing a data acquisition program, the data acquisition program being adapted to be executed by a computer functioning as a server configured to communicate with a plurality of repeaters, and being adapted to cause the computer to perform:

determining, for each of the plurality of repeaters, a terminal apparatus to be connected, and a connection order in which the plurality of repeaters connect to the terminal apparatuses to be connected, based on an upload time, which is a latest time at which detection data generated by each of the plurality of terminal apparatuses was uploaded to the server through one of the plurality of repeaters, and the identification information of the plurality of terminal apparatuses, so that detection data is preferentially acquired from a terminal apparatus that generated detection data of which the upload time is early in the information processing system; and transmitting, to each of the plurality of repeaters, the identification information of the terminal apparatus to which that repeater is to connect and connection order information indicating a connection order thereof.

According to the present disclosure, it is possible to provide a data acquisition method, an information processing system, and a non-transitory computer readable medium storing a data acquisition program capable of efficiently acquiring detection data from a plurality of terminal apparatuses.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 8 shows an example of an assignment table;

FIG. 9 shows changes in the assignment table that occur as a result of the assignment process;

FIG. 10 shows an example of the assignment table after the assignment process is performed;

DESCRIPTION OF EMBODIMENTS

First Embodiment

Figure 1:
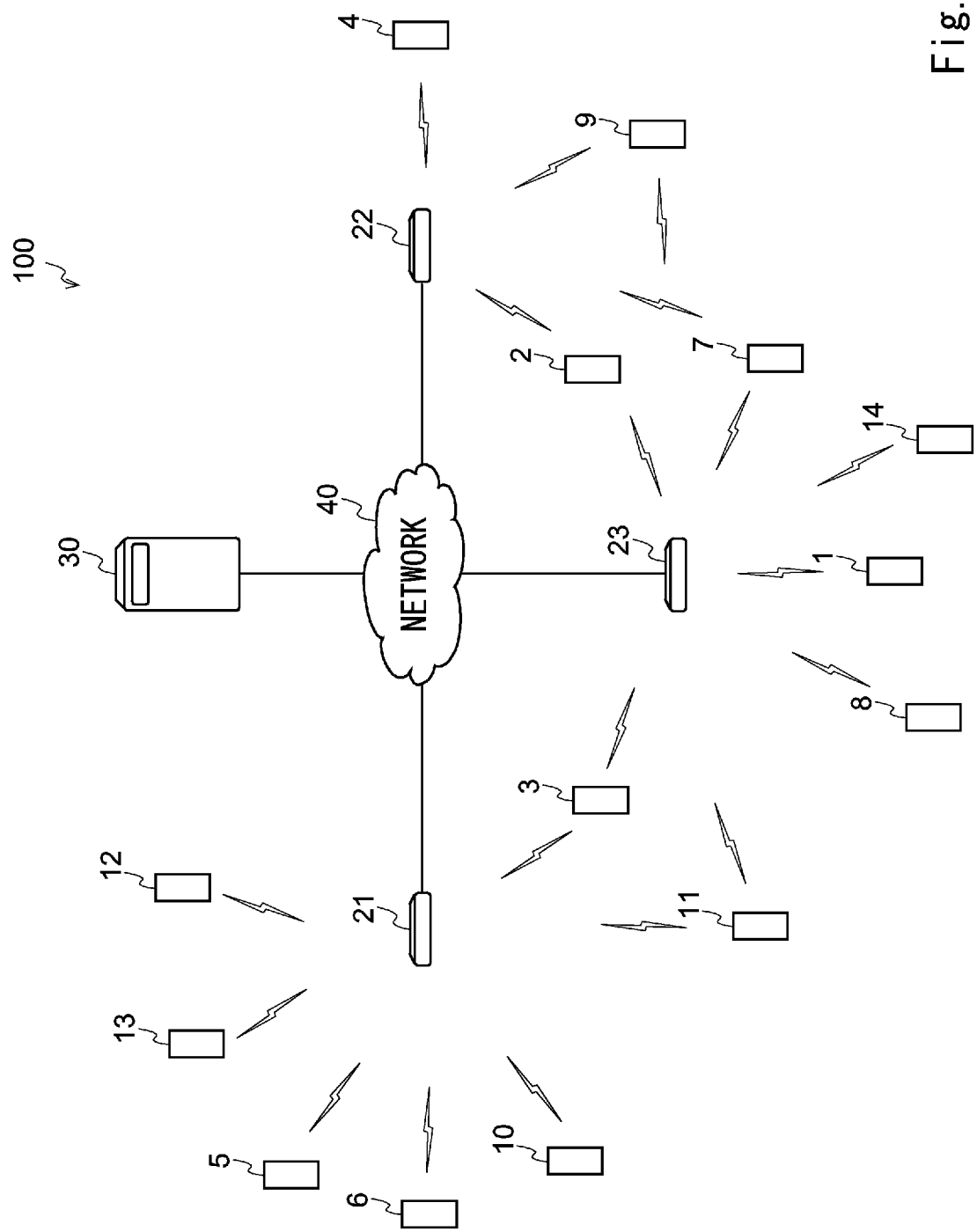
FIG. 1 is an example of an information processing system according to a first embodiment of the present disclosure.

A first embodiment according to the present disclosure will be described hereinafter with reference to the drawings. FIG. 1 shows an example of an information processing system according to the first embodiment of the present disclosure. The information processing system 100 includes terminal apparatuses 1 to 14, repeaters 21 to 23, and a server 30. Each of the terminal apparatuses 1 to 14 and the repeaters 21 to 23 can transmit/receive data to/from each other through radio communication in conformity to various radio communication standards, such as BLE (Bluetooth (Registered Trademark) Low Energy). Each of the repeaters 21 to 23 and the server 30 can transmit/receive data to/from each other through a network 40 including a LAN (Local Area Network) and/or a WAN (Wide Area Network).

Note that although FIG. 1 shows a configuration in which the repeaters 21 to 23 and the server 30 transmit/receive data through cables, the repeaters 21 to 23 and the server 30 may transmit/receive data to/from each other through wireless communication. Further, although the information processing system 100 shown in FIG. 1 includes 14 terminal apparatuses, the number of terminal apparatuses that can be included in the information processing system 100 is not limited to 14.

Each of the terminal apparatuses 1 to 14 is an apparatus that generates and provides detection data. Specific examples of the terminal apparatuses 1 to 14 include portable terminal apparatuses such as wearable terminals, and terminal apparatuses that can autonomously move. Each of the terminal apparatuses 1 to 14 can be equipped with a microphone(s) and an acceleration sensor(s). The detection data generated by each of the terminal apparatuses 1 to 14 includes ambient sounds around that terminal apparatus recorded by the microphone thereof and an acceleration measured by the acceleration sensor of that terminal apparatus. Each of the terminal apparatuses 1 to 14 store the generated detection data in a storage device provided in the apparatus itself.

Each of the terminal apparatuses 1 to 14 periodically transmits its own identification information. For example, each of the terminal apparatuses 1 to 14 can transmit an advertisement packet containing its own identification information. In this embodiment, various types of identification information, such as MAC addresses and serial numbers of the terminal apparatus 1 to 14, can be used as the identification information of the terminal apparatuses 1 to 14. The time interval at which each of the terminal apparatuses 1 to 14 transmits its own identification information can be, for example, 300 milliseconds. The identification information transmitted by each of the terminal apparatuses 1 to 14 is received by a repeater that can communicate with that terminal apparatus.

Further, in response to a request from the repeaters 21 to 23, each of the terminal apparatuses 1 to 14 provides detection data stored in the storage device of that terminal apparatus to the repeater that has transmitted the request. After providing the detection data to the repeater, each of the terminal apparatuses 1 to 14 deletes the detection data from the storage device.

Figure 2:
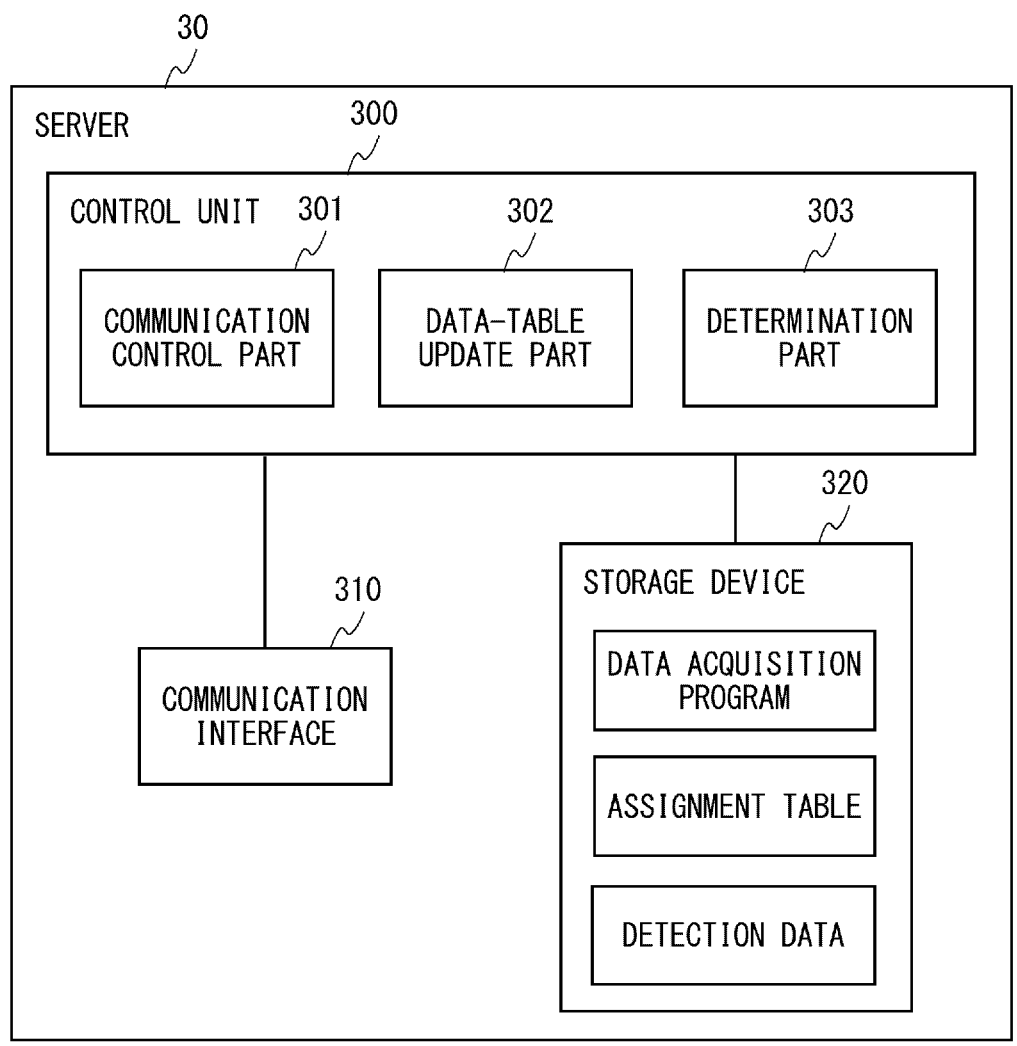
FIG. 2 is a block diagram showing a configuration of a server according to the first embodiment of the present disclosure.

FIG. 2 is a block diagram showing a configuration of the server 30 according to the first embodiment of the present disclosure. The server 30 is an information processing apparatus that acquires detection data generated by the terminal apparatuses 1 to 14 through the repeaters 21 to 23. The server 30 includes a control unit 300, a communication interface 310, and a storage device 320.

The control unit 300 is an arithmetic unit such as a CPU (Central Processing Unit) or MPU (Micro Processing Unit) that controls an electronic circuit(s) and an apparatus(es) included in the server 30. The control unit 300 performs a data acquisition method according to the present disclosure by loading a data acquisition program according to the present disclosure from the storage device 320 and executing the loaded program. The data acquisition program according to the present disclosure includes a communication control part 301, a data-table update part 302, and a determination part 303.

The communication control part 301 is a program module for controlling communication between the server 30 and the repeaters 21 to 23. When the communication control part 301 receives detection data of the terminal apparatuses 1 to 14 from the repeaters 21 to 23, it stores the received detection data in the storage device 320. Note that the communication control part 301 may store the detection data in a data server that the server 30 can access through the network 40.

Further, when the communication control part 301 receives, from any of the repeaters 21 to 23, a terminal-apparatus list including identification information of terminal apparatuses with which that repeater can communicate, the communication control part 301 provides the received terminal-apparatus list to the determination part 303.

The data-table update part 302 is a program for updating an assignment table, which is a data table. FIG. 8 shows an example of the assignment table. In the assignment table, upload times of detection data, identification information of the terminal apparatuses 1 to 14, identification information of the repeaters 21 to 23, and positions in a connection order of the terminal apparatuses 1 to 14 are registered while being associated with each other.

Each of the upload times is the latest time at which detection data of a respective one of the terminal apparatuses 1 to 14 was uploaded to the server 30. When the server 30 receives detection data of any of the terminal apparatuses 1 to 14 from one of the repeaters 21 to 23, the data-table update part 302 updates the upload time associated with the identification information of the terminal apparatus that generated the received detection data.

In this embodiment, various types of identification information, such as MAC addresses and serial numbers of the repeaters 21 to 23, can be used as the identification information of the repeaters 21 to 23. The connection order of the terminal apparatuses 1 to 14 is an order in which the repeaters 21 to 23 communicate with and connect to (hereinafter simply expressed to "connect to") the terminal apparatuses to be connected.

The determination part 303 is a program for determining terminal apparatuses to be connected to which the repeaters 21 to 23 connect, and a connection order in which the repeaters 21 to 23 connect to the terminal apparatuses to be connected. The determination part 303 determines, for each of the repeaters 21 to 23, the terminal apparatuses to be connected and the connection order based on the upload times and the identification information of the terminal apparatuses 1 to 14. Specifically, in the information processing system 100, the determination part 303 determines, for each of the repeaters 21 to 23, terminal apparatuses to be connected and a connection order thereof so that detection data is preferentially acquired from a terminal apparatus that generated detection data of which the upload time is early. Note that the determination part 303 determines, for each of the repeaters 21 to 23, the terminal apparatuses to be connected so that the same terminal apparatus to be connected is not assigned to two or more of the repeaters 21 to 23.

The communication interface 310 is an interface for performing data communication with the repeaters 21 to 23. When the communication interface 310 receives various data from the repeaters 21 to 23, it provides these data to the control unit 300. Further, the communication interface 310 can transmit various data to the repeaters 21 to 23 under the control of the control unit 300.

The storage device 320 is a storage device in which various data such as a data acquisition program, an assignment table, and detection data are stored.

Figure 3:
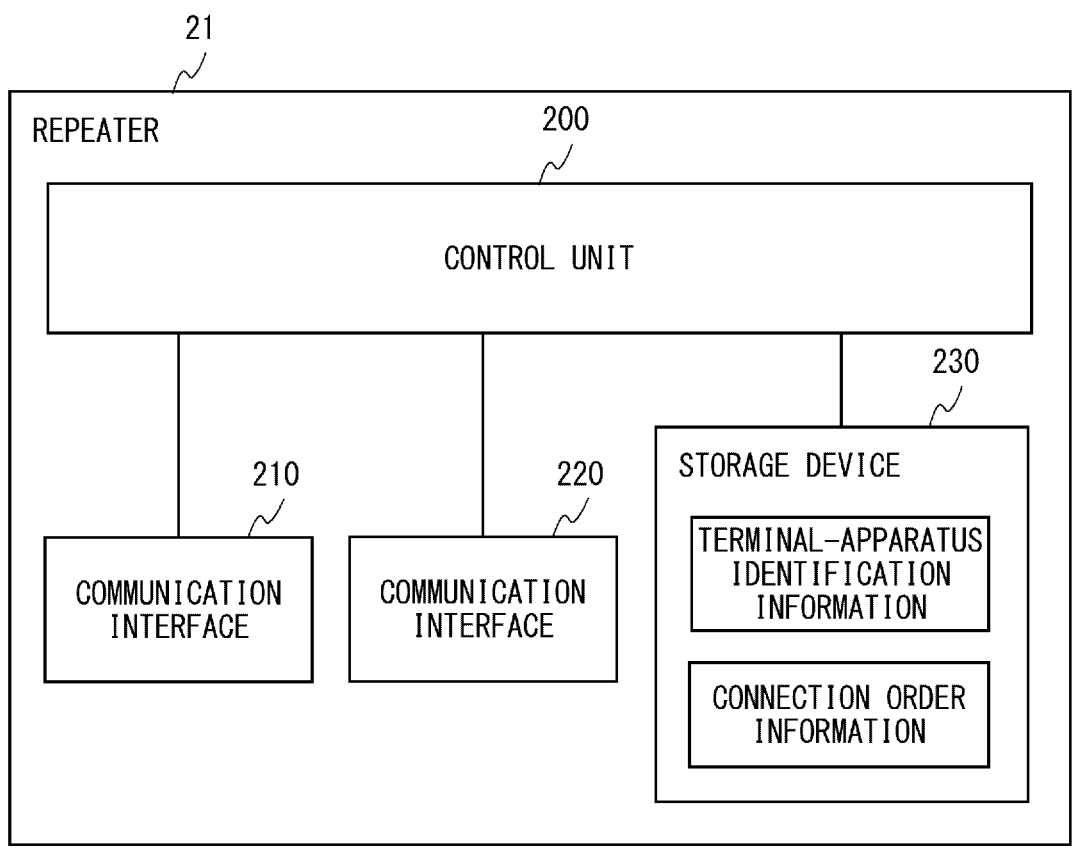
FIG. 3 is a block diagram showing a configuration of a repeater according to the first embodiment of the present disclosure.

FIG. 3 is a block diagram showing a configuration of the repeater 21 according to the first embodiment of the present disclosure. The configuration of the repeater 21 will be described hereinafter with reference to FIG. 3. Note that each of the repeaters 22 and 23 has a configuration identical to that of the repeater 21.

The repeater 21 includes a control unit 200, a communication interface 210, a communication interface 220, and a storage device 230.

The control unit 200 is an arithmetic apparatus such as a CPU or an MPU that controls an electronic circuit(s) and an apparatus(es) included in the repeater 21. The control unit 200 periodically generates a terminal-apparatus list including identification information of terminal apparatuses that can communicate with the repeater 21, and transmits the generated terminal-apparatus list to the server 30. The time interval at which the control unit 200 generates and transmits the terminal-apparatus list can be, for example, 30 seconds.

Specifically, the control unit 200 acquires identification information of a terminal apparatus contained in an advertisement packet transmitted from a terminal apparatus that can communicate with the repeater 21. Note that the control unit 200 preferably waits for advertise packets transmitted from the terminal apparatuses 1 to 14 for the duration of a time interval (such as 300 milliseconds) at which the terminal apparatuses 1 to 14 transmits advertise packets, and generates a terminal-apparatus list based on advertise packets that the control unit 200 has received during the duration of the time interval. In this way, the repeater 21 can generate a terminal-apparatus list including identification information of terminal apparatuses that can communicate with the repeater 21.

Further, the control unit 200 stores the identification information of the terminal apparatuses to be connected and the connection order information thereof received from the server 30 in the storage device 230, and updates these information items. Based on the identification information of the terminal apparatuses to be connected and the connection order information thereof, the control unit 200 connects to the terminal apparatuses to be connected, acquires detection data from these terminal apparatuses, and transmits the acquired detection data to the server 30.

The communication interface 210 is an interface for performing radio data communication with the terminal apparatuses 1 to 14. When the communication interface 210 receives various data from the terminal apparatuses 1 to 14, it provides these data to the control unit 200. Further, the communication interface 210 can transmit various data to the terminal apparatuses 1 to 14 under the control of the control unit 200.

The communication interface 220 is an interface for performing data communication with server 30. When the communication interface 220 receives various data from the server 30, it provides these data to the control unit 200. Further, the communication interface 220 can transmit various data to the server 30 under the control of the control unit 200.

The storage device 230 is a storage device in which various data such as identification information of terminal apparatuses to be connected and connection order information thereof received from the server 30, advertisement packets received from terminal apparatuses 1 to 14, and programs executed by the control unit 200 are stored.

Figure 4:
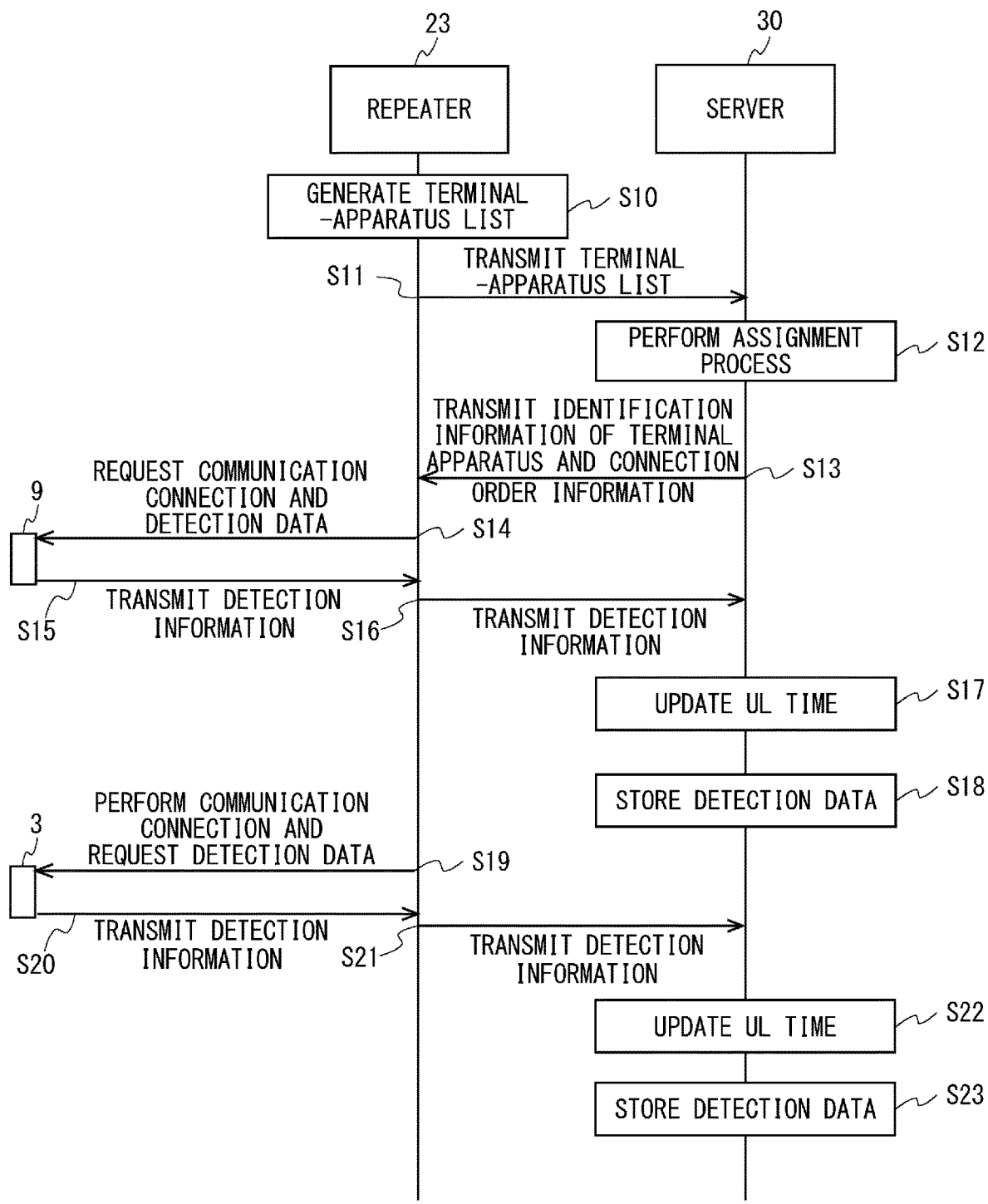
FIG. 4 shows an example of a sequence of processes performed in the information processing system according to the first embodiment of the present disclosure.

FIG. 4 shows an example of a sequence of processes performed in the information processing system 100. An example of processes that are performed when the repeater 23 acquires identification information (e.g., terminal apparatus IDs) of terminal apparatuses will be described hereinafter.

In a step S10, the repeater 23 receives advertisement packets from terminal apparatuses, acquires terminal apparatus IDs from the received advertisement packets, and generates a terminal-apparatus list. In a step S11, the repeater 23 transmits the generated terminal-apparatus list to the server 30. Note that the repeater 23 repeats the processes of the steps S10 and S11 at the aforementioned predetermined time intervals.

When the server 30 receives a terminal-apparatus list from the repeater 23, it performs an assignment process in a step S12. The assignment process will be described later with reference to FIGS. 5 to 7. In a step S13, the server 30 transmits identification information of terminal apparatuses to be connected to which the repeater 23 connects, and connection order information thereof to the repeater 23. In the following description, it is assumed that the terminal apparatuses to be connected to which the repeater 23 connects are terminal apparatuses 9, 3, 8, 1 and 14, and that the repeater 23 connects to these terminal apparatuses in the order of the terminal apparatuses 9, 3, 8, 1 and 14.

When the repeater 23 receives the identification information of the terminal apparatuses to be connected and the connection order information thereof from the server 30, in a step S14, the repeater 23 connects to the terminal apparatus 9, which is the first terminal apparatus to be connected, based on these information items, and transmits a request for detection data to the terminal apparatus 9. When the terminal apparatus 9 receives the request for detection data from the repeater 23, in a step S15, it transmits at least one detection data held in the terminal apparatus 9 to the repeater 23 and deletes the detection data that has been transmitted.

When the repeater 23 receives the detection data from the terminal apparatus 9, it transmits the detection data to the server 30 in a step S16. When the server 30 receives the detection data of the terminal apparatus 9 from the repeater 23, it updates the upload (UL) time of the detection data of the terminal apparatus 9 in the assignment table in a step S17. In a step S18, the server 30 stores the detection data of the terminal apparatus 9.

Next, in a step S19, the repeater 23 connects to the terminal apparatus 3, which is the second terminal apparatus to be connected, and transmits a request for detection data to the terminal apparatus 3. When the terminal apparatus 3 receives the request for detection data from the repeater 23, in a step S20, it transmits at least one detection data held in the terminal apparatus 3 to the repeater 23 and deletes the detection data that has been transmitted.

When the repeater 23 receives the detection data from the terminal apparatus 3, it transmits the detection data to the server 30 in a step S21. When the server 30 receives the detection data of the terminal apparatus 3 from the repeater 23, it updates the upload time of the detection data of the terminal apparatus 3 in the assignment table in a step S22. In a step S23, the server 30 stores the detection data of the terminal apparatus 3.

Similarly, the repeater 23 connects to each of the terminal apparatuses 8, 1 and 14 one after another, acquires detection data therefrom, and provides the acquired detection data to the server 30. The server 30 updates the upload time of the detection data of the terminal apparatuses 8, 1 and 14, and stores these detection data.

Figure 5:
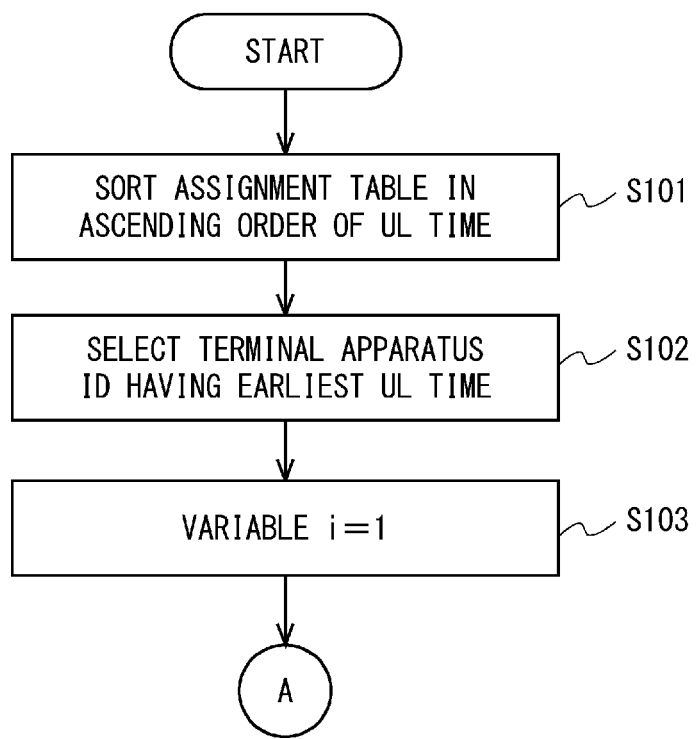
FIG. 5 is a flowchart showing an example of an assignment process performed by the server according to the first embodiment of the present disclosure.
Figure 6:
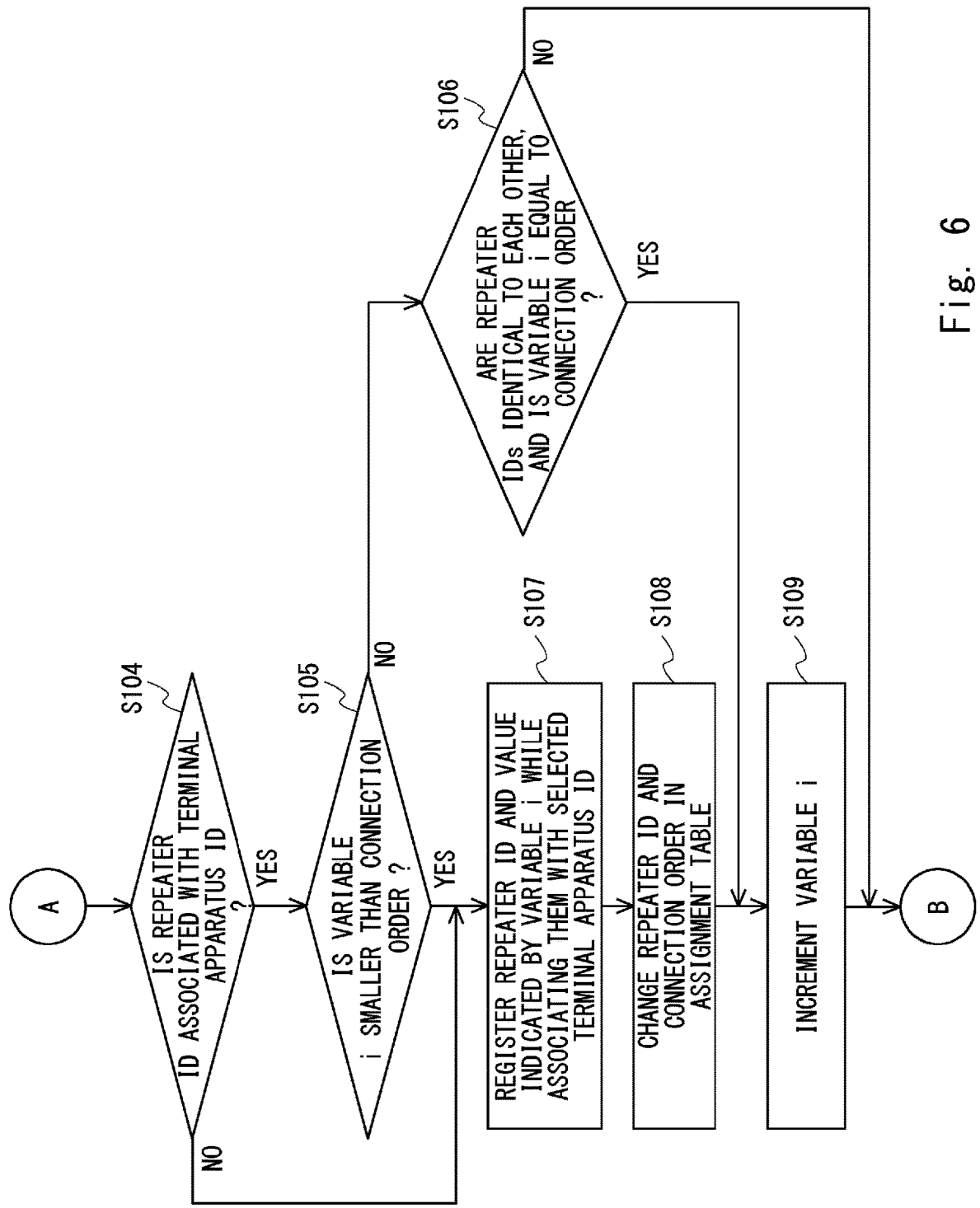
FIG. 6 is a flowchart showing an example of an assignment process performed by the server according to the first embodiment of the present disclosure.
Figure 7:
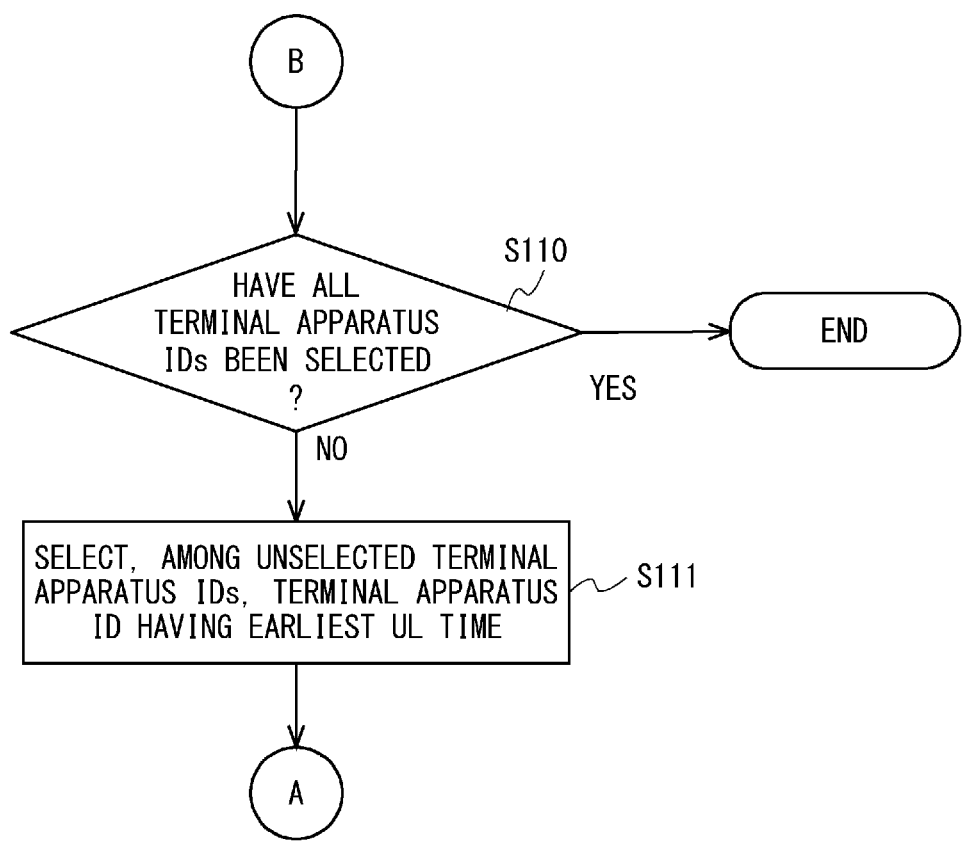
FIG. 7 is a flowchart showing an example of an assignment process performed by the server according to the first embodiment of the present disclosure.

FIGS. 5 to 7 show a flowchart of an example of an assignment process performed by the server 30. The server 30 performs the assignment process when it receives a terminal-apparatus list from any of the repeaters 21, 22 and 23.

In a step S101, the determination part 303 of the server 30 sorts the assignment table through (i.e., by using) the data-table update part 302 so that the upload times in the assignment table are arranged in ascending order. In a step S102, the determination part 303 selects, by referring to the assignment table, a terminal apparatus ID of which the upload time is the earliest among the terminal apparatus IDs included in the received terminal-apparatus list. In a step S103, the determination part 303 initializes a variable i, which indicates a position of a terminal apparatus in the connection order, to 1.

In a step S104, the determination part 303 determines, by referring to the assignment table, whether or not any of the repeater IDs is associated with the selected terminal apparatus ID. In this way, the determination part 303 determines whether or not a repeater is assigned to the terminal apparatus indicated by the selected terminal apparatus ID. When no repeater ID is associated with the selected terminal apparatus ID (No), i.e., when any of the repeaters is not assigned to the terminal apparatus indicated by the selected terminal apparatus ID, the process branches (i.e., goes) to a step S107.

In the step S104, when the determination part 303 determines that a repeater ID is associated with the selected terminal apparatus ID (Yes), in a step S105, it determines whether or not the variable i is smaller than the position in the connection order associated with that repeater ID. When the variable i is equal to or larger than the position in the connection order (No), the process branches to a step S106. In the step S106, the determination part 303 determines whether or not the repeater ID associated with the selected terminal apparatus ID is identical to the repeater ID of the repeater that has transmitted the terminal-apparatus list, and the variable i is equal to the position in the connection order associated with the selected terminal apparatus ID. When the repeater IDs are identical to each other, and the variable i is equal to the position in the connection order (Yes), the process branches to a step S109. In all the other cases (No), the process branches to a step S110.

In a step S105, when the determination part 303 determines that the variable i is smaller than the position in the connection order (Yes), in a step S107, it registers by using the data-table update part 302, the repeater ID of the repeater that has transmitted the terminal-apparatus list and the value indicated by the variable i in the assignment table while associating them with the selected terminal apparatus ID.

In this way, the server 30 assigns the repeater that has transmitted the terminal-apparatus list to the terminal apparatus indicated by the selected terminal apparatus ID, and specifies the position in the connection order at which the repeater connects to the terminal apparatus. In other words, when it is possible to move up a position in the connection order associated with identification information of a terminal apparatus included in the received latest terminal—apparatus list, the server 30 moves up that position in the connection order.

In a step S108, the determination part 303 updates, through the data-table update part 302, the assignment table by changing the position in the connection order that should be changed as a result of the registration of the repeater ID and the value of variable i in the step S107. In a step S109, the server 30 increments the variable i.

In a step S110, the determination part 303 determines whether or not all the terminal apparatus IDs included in the received terminal-apparatus list have been selected. When all the terminal apparatus IDs included in the received terminal-apparatus list have been selected (Yes), the assignment process is finished.

On the other hand, when not all the terminal apparatus IDs included in the received terminal-apparatus list have been selected (No), in a step S111, the determination part 303 selects, by referring to the assignment table, a terminal apparatus ID of which the upload time is the earliest among the unselected terminal apparatus IDs included in the received terminal-apparatus list, and the process returns to the step S104. In this way, the server 30 performs the assignment process for all the terminal apparatus IDs included in the received terminal-apparatus list.

FIG. 9 shows changes in the assignment table that occur as a result of the assignment process. The assignment table shown in FIG. 9 has been sorted so that the upload times are arranged in ascending order, though the upload times themselves are omitted. In the example shown in FIG. 9, it is assumed that the server 30 has received a terminal-apparatus list including terminal apparatus IDs (ST1, ST2, ST3, ST7, ST8, ST9, ST11 and ST14) of terminal apparatuses 1, 2, 3, 7, 8, 9, 11 and 14 from the repeater 23 (having a repeater ID: HUB03).

The server 30 selects the terminal apparatus IDs included in the terminal-apparatus list one after another in ascending order of their upload times (i.e., from the earliest upload time toward the latest upload time), i.e., selects the terminal apparatus IDs ST7, ST9, ST2, ST3, ST8, ST1, ST11 and ST14 one after another in this order.

Firstly, the server 30 selects the terminal apparatus ID (ST7). A repeater ID (HUB02) and a position (1) in the connection order are associated with the terminal apparatus ID (ST7) in the assignment table in a first state. Since the initial value (1) of the variable i is equal to the position (1) in the connection order, the server 30 does not update the assignment table.

Next, the server 30 selects the terminal apparatus ID (ST9). The repeater ID (HUB02) and a position (2) in the connection order are associated with the terminal apparatus ID (ST9) in the assignment table in the first state. The initial value (1) of the variable i is smaller than the position (2) in the connection order. Therefore, the server 30 registers the repeater ID (HUB03) of the repeater 23 and the initial value (1) of the variable i while associating them with the terminal apparatus ID (ST9), and thereby updates the assignment table from the first state to a second state. In this case, positions in the connection order enclosed in bold-line squares in the assignment table in the first state corresponds to the positions in the connection order that should be changed as a result of the registration of the repeater ID (HUB03) and the value (1) of the variable i. Further, the server 30 increments the variable i.

Next, the server 30 selects the terminal apparatus ID (ST2). The repeater ID (HUB02) and a position (2) in the connection order are associated with the terminal apparatus ID (ST2) in the assignment table in the second state. Since the incremented variable i (2) is equal to the position (2) in the connection order, the server 30 does not update the assignment table.

Next, the server 30 selects the terminal apparatus ID (ST3). A repeater ID (HUB01) and a position (4) in the connection order are associated with the terminal apparatus ID (ST3) in the assignment table in the second state. The incremented variable i (2) is smaller than the position (4) in the connection order. Therefore, the server 30 registers the repeater ID (HUB03) of the repeater 23 and the incremented variable i (2) while associating them with the terminal apparatus ID (ST3), and thereby updates the assignment table from the second state to a third state. In this case, positions in the connection order enclosed in bold-line squares in the assignment table in the second state corresponds to the positions in the connection order that should be changed as a result of the registration of the repeater ID (HUB03) and the value (2) of the variable i. Further, the server 30 increments the variable i.

Next, the server 30 selects the terminal apparatus ID (ST8). No repeater ID and no position in the connection order are associated with the terminal apparatus ID (ST8) in the assignment table in the third state. Therefore, the server 30 registers the repeater ID (HUB03) of the repeater 23 and the incremented variable i (3) while associating them with the terminal apparatus ID (ST8), and thereby updates the assignment table from the third state to a fourth state. In this case, positions in the connection order enclosed in bold-line squares in the assignment table in the third state corresponds to the positions in the connection order that should be changed as a result of the registration of the repeater ID (HUB03) and the value (3) of the variable i. Further, the server 30 increments the variable i.

Next, the server 30 selects the terminal apparatus ID (ST1). The repeater ID (HUB03) and a position (4) in the connection order are associated with the terminal apparatus ID (ST1) in the assignment table in the fourth state. Since the repeater ID (HUB03) of the repeater that has transmitted the terminal apparatus is identical to the registered repeater ID (HUB03), and the incremented variable i (4) is equal to the position (4) in the connection order, the server 30 does not update the assignment table and increments the variable i.

Next, the server 30 selects the terminal apparatus ID (ST11). A repeater ID (HUB01) and a position (5) in the connection order are associated with the terminal apparatus ID (ST11) in the assignment table in the fourth state. Since the incremented variable i (5) is equal to the position (5) in the connection order, the server 30 does not update the assignment table.

Lastly, the server 30 selects the terminal apparatus ID (ST14). The repeater ID (HUB03) and a position (5) in the connection order are associated with the terminal apparatus ID (ST14) in the assignment table in the fourth state. Since the incremented variable i (5) is equal to the position (5) in the connection order, the server 30 does not update the assignment table and the assignment process is finished.

FIG. 10 shows the assignment table after the assignment process has been performed. As shown in FIG. 10, in the information processing system 100, identification information of a repeater and a position thereof in the connection order are associated with identification information of each of the terminal apparatuses 1 to 14 so that detection data is preferentially acquired from a terminal apparatus that generated detection data of which the upload time is early. Further, identification information of a repeater is associated with identification information of one of the terminal apparatuses 1 to 14 in such a manner that the same terminal apparatus to be connected is not assigned to two or more of the repeaters 21 to 23.

In the above-described embodiment, the server 30 determines, for each of the repeaters 21 to 23, terminal apparatuses to be connected and a connection order thereof based on the upload time of detection data of each of the plurality of terminal apparatuses in the information processing system 100, and the identification information of each of the terminal apparatuses, so that detection data is preferentially acquired from a terminal apparatus that generated detection data of which the upload time is early in the information processing system 100. Note that the server 30 determines, for each of the repeaters 21 to 23, terminal apparatuses to be connected in such a manner that the same terminal apparatus to be connected is not assigned to two or more of the repeaters 21 to 23. Next, the server 30 transmits, to each of the repeaters 21 to 23, identification information of terminal apparatuses to which that repeater to connect and connection order information indicating a connection order thereof. When each of the repeaters 21 to 23 receives identification information of terminal apparatuses to which the repeater is to connect and connection order information thereof from the server 30, the repeater connects to the terminal apparatuses to be connected according to the order indicated by the connection order information, and thereby acquire detection data therefrom.

In this way, in the information processing system 100, detection data is preferentially acquired from a terminal apparatus that generated detection data of which the upload time is early. Therefore, even when one of the terminal apparatuses is present in a space where communication areas of a plurality of repeaters overlap each other, any of other repeaters does not acquire detection data from that terminal apparatus immediately after the aforementioned repeater acquired the detection data from that terminal apparatus, so that no useless session is performed. Therefore, the server 30 can efficiently acquire detection data from each of the terminal apparatuses in the information processing system 100.

Further, in the above-described embodiment, when the server 30 receives a terminal-apparatus list from one of the repeaters 21 to 23, it determines, for each of the repeaters 21 to 23, terminal apparatuses to be connected and a connection order thereof, and transmits, to each of the repeaters 21 to 23, identification information of the terminal apparatuses to which the repeater is to connect and connection order information thereof.

In this way, the identification information of the terminal apparatuses to which the repeater is to connect and the connection order information thereof are transmitted not only to the repeater that has transmitted the latest terminal-apparatus list but also to the other repeaters. As a result, it is possible to ensure the consistency of the identification information of the terminal apparatuses to be connected and the connection order information thereof among all the repeaters included in the information processing system 100.

Further, in the above-described embodiment, the server 30 determines, among the terminal apparatuses indicated by the identification information of the terminal apparatuses included in the received latest terminal-apparatus list, a terminal apparatus to which none of the repeaters 21 to 23 has been assigned as a terminal apparatus to which the repeater that has transmitted the latest terminal-apparatus list is to connect.

In this way, when a terminal apparatus which went out of the communication area of the repeaters 21 to 23 and therefore to which none of the repeaters 21 to 23 has been assigned enters the communication area of one of the repeaters 21 to 23 again, a repeater that can communicate with that terminal apparatus is assigned to that terminal apparatus. As a result, the server 30 can acquire detection data from that terminal apparatus through the repeater newly assigned to that terminal apparatus.

Further, in the above-described embodiment, when the server 30 can, by referring to the assignment table, move up a position in the connection order associated with identification information of a terminal apparatus included in the received latest terminal-apparatus list, the server 30 determines the that terminal apparatus, of which it can move up the position in the connection order, as a terminal apparatus to which the repeater that has transmitted the latest terminal-apparatus list is to connect, and determines the moved-up position in the connection order as a position in the connection order of the terminal apparatus to which the repeater is to connect.

In this way, since the position in the connection order of the terminal apparatus that generated the detection data of which the upload time is early is moved up, the detection data is preferentially acquired from that terminal apparatus.

Further, in the above-described embodiment, when identification information of a second repeater other than a first repeater that has transmitted the latest terminal-apparatus list is associated with the identification information of the terminal apparatus of which the position in the connection order has been moved up in the assignment table, and the server 30 can, as a result of the moving-up of the position in the connection order, move up the position in the connection order associated with the identification information of the second repeater, the server 30 determines the moved-up position in the connection order as a position in the connection order of the terminal apparatus to which the second repeater is to connect.

In this way, since the position in the connection order of the terminal apparatus to which the second repeater is to connect is moved up, it is possible to advance the timing at which the second repeater, which has not transmitted the latest terminal-apparatus list, acquires detection data.

Second Embodiment

Figure 11:
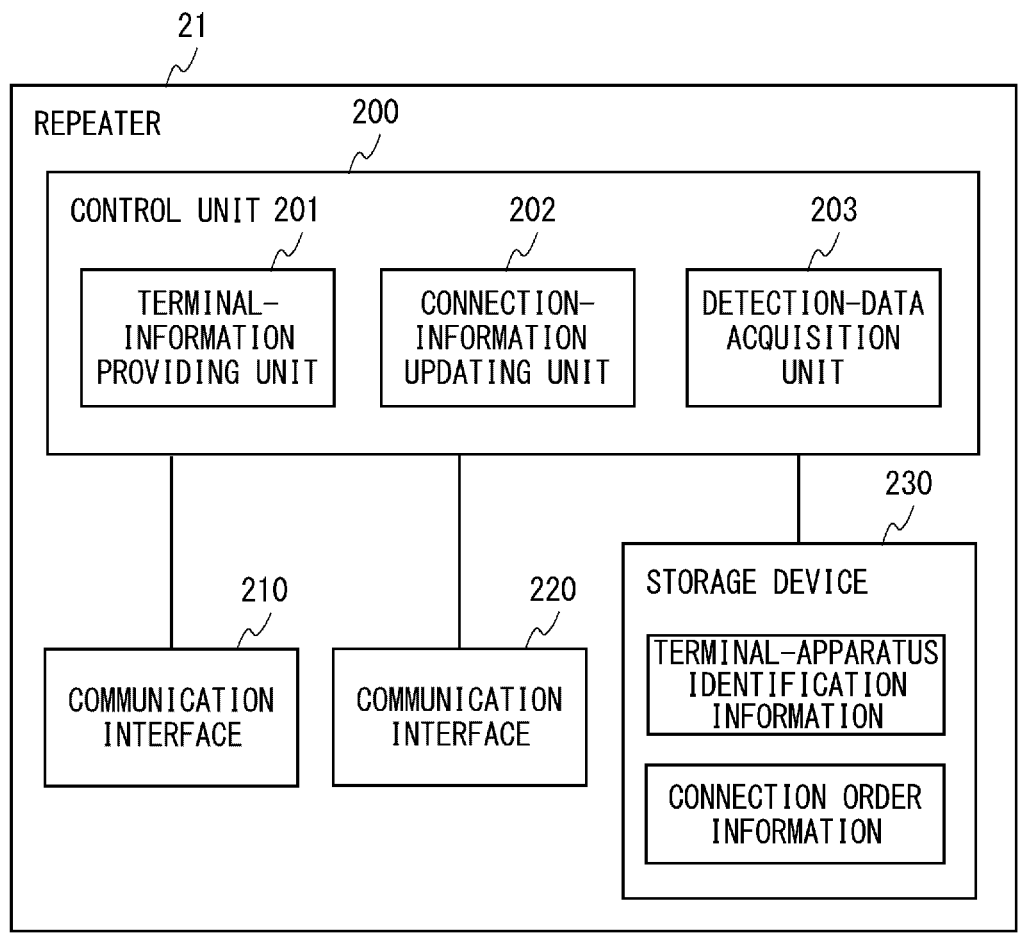
FIG. 11 is a block diagram showing a configuration of a repeater according to a second embodiment of the present disclosure.

FIG. 11 is a block diagram showing a repeater according to a second embodiment. In the second embodiment, the control unit 200 of each of repeaters 21 to 23 loads a terminal-information providing unit 201, a connection-information updating unit 202, and a detection-data acquisition unit 203, which are computer programs, from the storage device 230, and execute these loaded programs. A configuration of the repeater 21 will be described hereinafter with reference to FIG. 11. Note that each of the repeaters 22 and 23 has a configuration identical to that of the repeater 21.

The terminal-information providing unit 201 periodically generates a terminal-apparatus list including identification information of terminal apparatuses that can communicate with the repeater 21, and transmits the generated terminal-apparatus list to the server 30. The connection-information updating unit 202 stores the identification information of the terminal apparatuses to be connected and connection order information thereof received from the server 30 in the storage device 230 of the repeater 21, and updates these information items. Based on the identification information of the terminal apparatuses to be connected and the connection order information thereof, the detection-data acquisition unit 203 connects to the terminal apparatuses to be connected, acquires detection data from these terminal apparatuses, and transmits the acquired detection data to the server 30.

Figure 12:
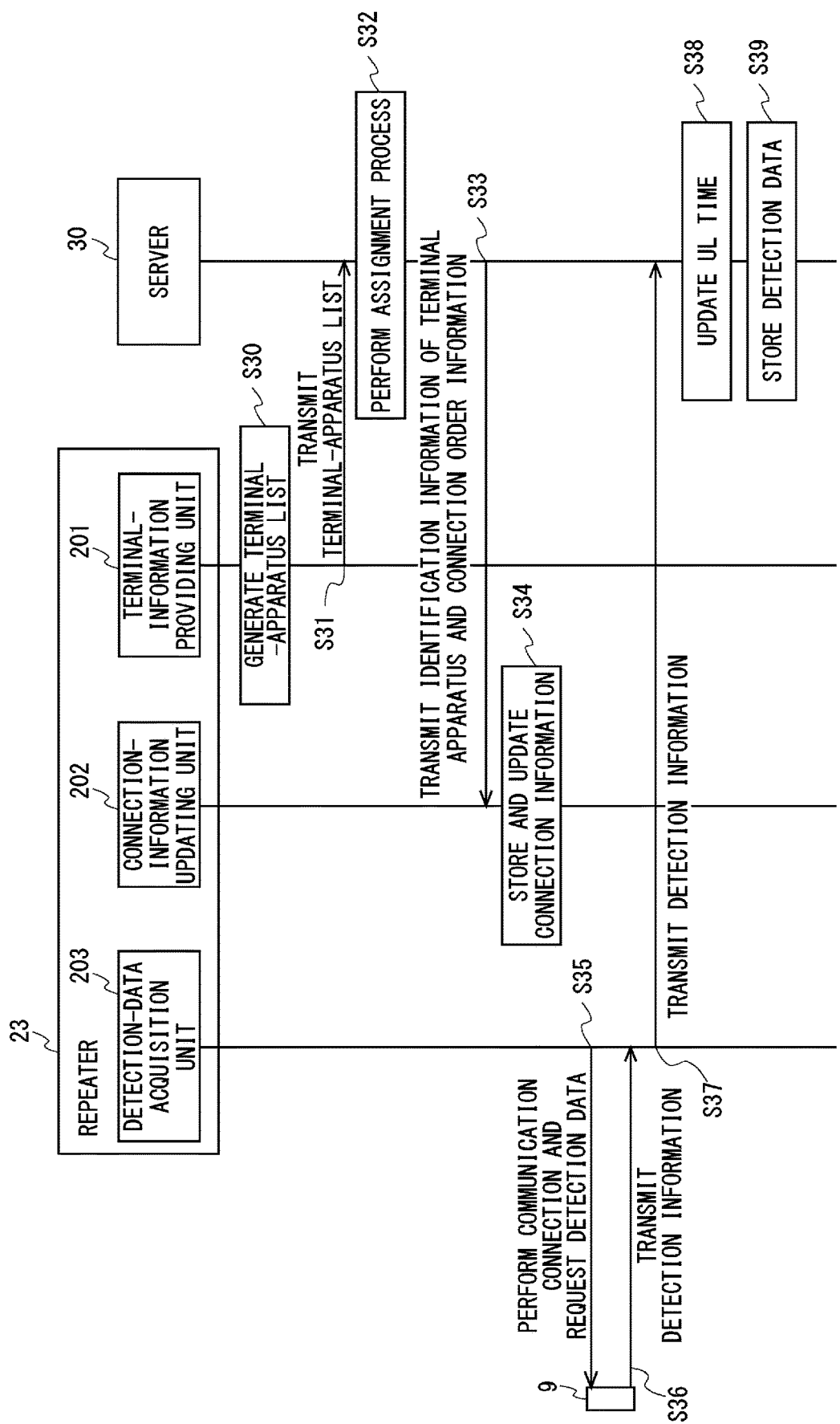
FIG. 12 shows an example of a sequence of processes performed in the information processing system according to the second embodiment of the present disclosure.

FIG. 12 shows an example of a sequence of processes performed in the information processing system 100 according to the second embodiment. An example of processes that are performed when the repeater 23 acquires terminal apparatus IDs will be described hereinafter.

In a step S30, the terminal-information providing unit 201 of the repeater 23 receives advertisement packets from terminal apparatuses, acquires terminal apparatus IDs from the received advertisement packets, and generates a terminal-apparatus list. In a step S31, the terminal-information providing unit 201 transmits the generated terminal-apparatus list to the server 30. Note that the terminal-information providing unit 201 repeats the processes of the steps S30 and S31 at the aforementioned predetermined time intervals.

When the server 30 receives a terminal-apparatus list from the repeater 23, it performs an assignment process in a step S32. In a step S33, the server 30 transmits identification information of terminal apparatuses to be connected to which the repeater 23 connects, and connection order information thereof to the repeater 23. In the following description, it is assumed that the terminal apparatuses to be connected to which the repeater 23 connects are terminal apparatuses 9, 3, 8, 1 and 14, and that the repeater 23 connects to these terminal apparatuses in the order of the terminal apparatuses 9, 3, 8, 1 and 14.

When the repeater 23 receives the identification information of the terminal apparatuses to be connected and the connection order information thereof from the server 30, in a step S34, the connection-information updating unit 202 stores the identification information of the terminal apparatuses to be connected and the connection order information thereof in the storage device 230, and updates these information items. In a step S35, the detection-data acquisition unit 203 connects to the terminal apparatus 9, which is the first terminal apparatus to be connected, based on the identification information of the terminal apparatuses to be connected and the connection order information thereof stored in the storage device 230, and transmits a request for detection data to the terminal apparatus 9. When the terminal apparatus 9 receives the request for detection data from the repeater 23, in a step S36, it transmits at least one detection data held in the terminal apparatus 9 to the repeater 23 and deletes the detection data that has been transmitted.

When the repeater 23 receives the detection data from the terminal apparatus 9, the detection-data acquisition unit 203 transmits the detection data to the server 30 in a step S37. When the server 30 receives the detection data of the terminal apparatus 9 from the repeater 23, it updates the upload time of the detection data of the terminal apparatus 9 in the assignment table in a step S38. In a step S39, the server 30 stores the detection data of the terminal apparatus 9.

Similarly, the repeater 23 connects to each of the terminal apparatuses 3, 8, 1 and 14 one after another, acquires detection data, and provides the acquired detection data to the server 30. The server 30 updates the upload times of the detection data of the terminal apparatuses 3, 8, 1 and 14, and stores these detection data.

Third Embodiment

In a third embodiment, when the server 30 determines, in the step S105 of the assignment process, that the variable i is smaller than the position in the connection order associated with the repeater ID of the repeater that has transmitted the latest terminal-apparatus list, the server 30 can further determine whether or not the position in the connection order is equal to or smaller than a predetermined value N. When the position in the connection order is larger than the predetermined value N, the server 30 registers the repeater ID of the repeater that has transmitted the terminal-apparatus list and a value indicated by the variable i in the assignment table while associating them with the selected terminal apparatus ID.

On the other hand, when the position in the connection order is equal to or smaller than the predetermined value N, the server 30 changes neither the repeater ID associated with the selected terminal apparatus ID nor the position thereof in the connection order. In other words, even when it is possible to move up the position in the connection order associated with the identification information of the terminal apparatus included in the received latest terminal-apparatus list, if the position in the connection order is equal to or smaller than the predetermined value N, the server 30 changes neither the repeater that connects to the terminal apparatus of which the position in the connection order is equal to or smaller than the predetermined value N nor the position in the connection order of that terminal apparatus.

The predetermined value N is an integer and can be determined based on the time required for the repeaters 21 to 23 to receive identification information of a terminal apparatus to be connected and connection order information thereof transmitted by the server 30. Further, the predetermined value N can be determined based on the aforementioned time and the time required for the server 30 to receive a terminal-apparatus list transmitted by the repeaters 21 to 23. Each of these times includes a delay time.

There is a possibility that when the server 30 transmits new identification information of terminal apparatuses to be connected and connection order information thereof, the reception of the new identification information of the terminal apparatuses to be connected and the connection order information thereof may be delayed in some of the repeaters 21 to 23. In such a case, there will be repeaters in different states, i.e., a repeater(s) that connects to a terminal apparatus based on identification information of terminal apparatuses to be connected and connection order information thereof which have not been updated yet and a repeater(s) that connects to a terminal apparatus based on new identification information of terminal apparatuses to be connected and connection order information thereof. Therefore, there is a possibility that a plurality of repeaters may connect to the same terminal apparatus at the same time.

In the third embodiment, for example, when the predetermined value N is "2", the server 30 does not change the position in the connection order of the terminal apparatus to which a position "1" or "2" in the connection order has been assigned. Therefore, when the reception of the new identification information of terminal apparatuses to be connected and connection order information thereof is delayed only in the repeater 21, even if the repeater 21 connects to the terminal apparatus to which the position "1" or "2" in the connection order is assigned based on the old identification information of terminal apparatuses to be connected and connection order information thereof, the other repeaters 22 and 23 do not connect to that terminal apparatus. Then, the repeater 21 can receive the new identification information of terminal apparatuses to be connected and the connection order information thereof before it connects to the terminal apparatus to which a position "3" in connection order is assigned.

Therefore, in the third embodiment, even when the reception of identification information of terminal apparatuses to be connected and connection order information thereof transmitted from the server 30 is delayed in some of the repeaters 21 to 23, the repeaters 21 to 23 can be prevented from connecting to the same terminal apparatus at the same time.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals. The computer includes various types of apparatuses such as a PC (Personal Computer), a server, a CPU, an MPU, an FPGA (Field-Programmable Gate Array), and an ASIC (Application Specific Integrated Circuit).

The present disclosure is not limited to the above-described embodiments, and they can be modified as appropriate without departing from the scope and spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A data acquisition method performed in an information processing system comprising a plurality of terminal apparatuses, a plurality of repeaters, and a server, wherein each of the plurality of repeaters requests detection data from a terminal apparatus with which that repeater can communicate, the plurality of terminal apparatuses generates detection data in response to requests from the plurality of repeaters and transmit the generated detection data to the plurality of repeaters, each of the plurality of repeaters transmits, to the server, the detection data received from the terminal apparatus with which that repeater can communicate, each of the plurality of repeaters transmits its own identification information to at least one of the plurality of repeaters, the plurality of repeaters generates a terminal-apparatus list including identification information of terminal apparatuses received from the terminal apparatuses, and transmit the generated terminal-apparatus list to the server, the server determines, for each of the plurality of repeaters, a terminal apparatus to be connected, and a connection order in which the plurality of repeaters connect to the terminal apparatuses to be connected, based on an upload time, which is a latest time at which detection data of each of the plurality of terminal apparatuses was uploaded to the server, and the identification information of the plurality of terminal apparatuses, so that detection data is preferentially acquired from a terminal apparatus that generated detection data of which the upload time is early in the information processing system, the server transmits, to each of the plurality of repeaters, the identification information of the terminal apparatus to which that repeater is to connect and connection order information indicating a connection order thereof, and when the plurality of repeaters receives, from the server, the identification information of the terminal apparatuses to be connected and the connection order information thereof, the plurality of repeaters connects to the terminal apparatuses to be connected according to the order indicated by the connection order information, and acquire detection data therefrom.

2. The data acquisition method according to claim 1, wherein when the server receives the terminal-apparatus list from one of the plurality of repeaters, the server determines, for each of the plurality of repeaters, the terminal apparatus to be connected and the connection order thereof, and transmits, to each of the plurality of repeaters, the identification information of the terminal apparatus to which the repeater is to connect and the connection order information thereof.

3. The data acquisition method according to claim 1, wherein the server determines, among the terminal apparatuses indicated by the identification information of the terminal apparatuses included in the received latest terminal-apparatus list, a terminal apparatus to which none of the plurality of repeaters has been assigned as a terminal apparatus to which the repeater that has transmitted the latest terminal-apparatus list is to connect.

4. The data acquisition method according to claim 1, wherein the server comprises a data table in which the upload times, the identification information of the plurality of terminal apparatuses, the identification information of the plurality of repeaters, and positions in the connection order of the terminal apparatuses are registered while being associated with one another, the server is further configured to:
when the server can, by referring to the data table, move up a position in the connection order associated with the identification information of the terminal apparatus included in the received latest terminal-apparatus list, determine the terminal apparatus of which the position in the connection order can be moved up as a terminal apparatus to which the repeater that has transmitted the latest terminal-apparatus list is to connect, and
determine the position in the connection order that has been moved up as a position in the connection order of the terminal apparatus to which the repeater that has transmitted the latest terminal-apparatus list is to connect.

5. The data acquisition method according to claim 4, wherein when the server can move up the position in the connection order associated with the identification information of the terminal apparatus included in the received latest terminal-apparatus list, but the position in the connection order is equal or smaller than a predetermined value, the server changes neither the repeater that connects to the terminal apparatus of which the position in the connection order is equal to or smaller than the predetermined value nor the position in the connection order.

6. The data acquisition method according to claim 4, wherein when identification information of a second repeater other than a first repeater that has transmitted the latest terminal-apparatus list is associated with the identification information of the terminal apparatus of which the position in the connection order has been moved up in the assignment table, and the server can, as a result of the moving-up of the position in the connection order, move up the position in the connection order associated with the identification information of the second repeater, the server determines the moved-up position in the connection order as a position in the connection order of the terminal apparatus to which the second repeater is to connect.

7. The data acquisition method according to claim 1, wherein
each of the plurality of repeaters is configured to:
generate a terminal-apparatus list and transmit the generated terminal-apparatus list to the server;
store identification information of the terminal apparatus to be connected and the connection order information thereof received from the server in a storage device of the repeater, and update these information items; and
acquire the detection data from each of the plurality of terminal apparatuses based on the identification information of the terminal apparatus to be connected and the connection order information stored in the storage device, and transmit the acquired detection data to the server.

8. The data acquisition method according to claim 1, wherein the detection data includes a sound recorded by the terminal apparatus and an acceleration of the terminal apparatus.

9. An information processing system comprising:
a plurality of terminal apparatuses configured to generate and provide detection data;
a plurality of repeaters configured to acquire detection data from each of the plurality of terminal apparatuses and transmit the acquired detection data to a server; and
a server configured to determine terminal apparatuses to be connected to which the plurality of repeaters connect, and a connection order in which the plurality of repeaters connect to the terminal apparatuses to be connected, wherein each of the plurality of terminal apparatuses transmits its own identification information to at least one repeater,
the repeater generates a terminal-apparatus list including identification information of terminal apparatuses received from the terminal apparatuses, and transmits the generated terminal-apparatus list to the server,
the server is configured to:
determine, for each of the plurality of repeaters, a terminal apparatus to be connected and a connection order thereof based on an upload time, which is a latest time at which detection data of each of the plurality of terminal apparatuses was uploaded to the server, and the identification information of the plurality of terminal apparatuses, so that detection data is preferentially acquired from a terminal apparatus that generated detection data of which the upload time is early in the information processing system; and
transmit, to each of the plurality of repeaters, the identification information of the terminal apparatus to which that repeater is to connect and connection order information indicating a connection order thereof, and
when the plurality of repeaters receives, from the server, the identification information of the terminal apparatuses to be connected and the connection order information thereof, the plurality of repeaters connects to the terminal apparatuses to be connected according to the order indicated by the connection order information, and acquire detection data therefrom.

10. The information processing system according to claim 9, wherein when the server receives the terminal-apparatus list from one of the plurality of repeaters, the server determines, for each of the plurality of repeaters, the terminal apparatus to be connected and the connection order thereof, and transmits, to each of the plurality of repeaters, the identification information of the terminal apparatus to which the repeater is to connect and the connection order information thereof.

11. The information processing system according to claim 9, wherein the server determines, among the terminal apparatuses indicated by the identification information of the terminal apparatuses included in the received latest terminal—apparatus list, a terminal apparatus to which none of the plurality of repeaters has been assigned as a terminal apparatus to which the repeater that has transmitted the latest terminal-apparatus list is to connect.

12. The information processing system according to claim 9, wherein
the server comprises a data table in which the upload times, the identification information of the plurality of terminal apparatuses, the identification information of the plurality of repeaters, and positions in the connection order of the terminal apparatuses are registered while being associated with one another,
the server is further configured to:
when the server can, by referring to the data table, move up a position in the connection order associated with the identification information of the terminal apparatus included in the received latest terminal-apparatus list,
determine the terminal apparatus of which the position in the connection order can be moved up as a terminal apparatus to which the repeater that has transmitted the latest terminal-apparatus list is to connect, and
determine the position in the connection order that has been moved up as a position in the connection order of the terminal apparatus to which the repeater that has transmitted the latest terminal-apparatus list is to connect.

13. The information processing system according to claim 12, wherein when the server can move up the position in the connection order associated with the identification information of the terminal apparatus included in the received latest terminal-apparatus list, but the position in the connection order is equal or smaller than a predetermined value, the server changes neither the repeater that connects to the terminal apparatus of which the position in the connection order is equal to or smaller than the predetermined value nor the position in the connection order.

14. The information processing system according to claim 12, wherein when identification information of a second repeater other than a first repeater that has transmitted the latest terminal-apparatus list is associated with the identification information of the terminal apparatus of which the position in the connection order has been moved up in the assignment table, and the server can, as a result of the moving-up of the position in the connection order, move up the position in the connection order associated with the identification information of the second repeater, the server determines the moved-up position in the connection order as a position in the connection order of the terminal apparatus to which the second repeater is to connect.

15. The information processing system according to claim 9, wherein
each of the plurality of repeaters is configured to:
generate a terminal-apparatus list and transmit the generated terminal-apparatus list to the server;
store identification information of the terminal apparatus to be connected and the connection order information thereof received from the server in a storage device of the repeater, and update these information items; and
acquire the detection data from each of the plurality of terminal apparatuses based on the identification information of the terminal apparatus to be connected and the connection order information stored in the storage device, and transmit the acquired detection data to the server.

16. The information processing system according to claim 9, wherein the detection data includes a sound recorded by the terminal apparatus and an acceleration of the terminal apparatus.

17. A non-transitory computer readable medium storing a data acquisition program, the data acquisition program being adapted to be executed by a computer functioning as a server configured to communicate with a plurality of repeaters, and being adapted to cause the computer to perform:
determining, for each of the plurality of repeaters, a terminal apparatus to be connected, and a connection order in which the plurality of repeaters connect to the terminal apparatuses to be connected, based on an upload time, which is a latest time at which detection data generated by each of the plurality of terminal apparatuses was uploaded to the server through one of the plurality of repeaters, and the identification information of the plurality of terminal apparatuses, so that detection data is preferentially acquired from a terminal apparatus that generated detection data of which the upload time is early in the information processing system; and
transmitting, to each of the plurality of repeaters, the identification information of the terminal apparatus to which that repeater is to connect and connection order information indicating a connection order thereof.

* * * * *